*INVENTORS*
DONALD G. GYDE
HOWARD R. MEINDL
FREDERICK T. VARANI

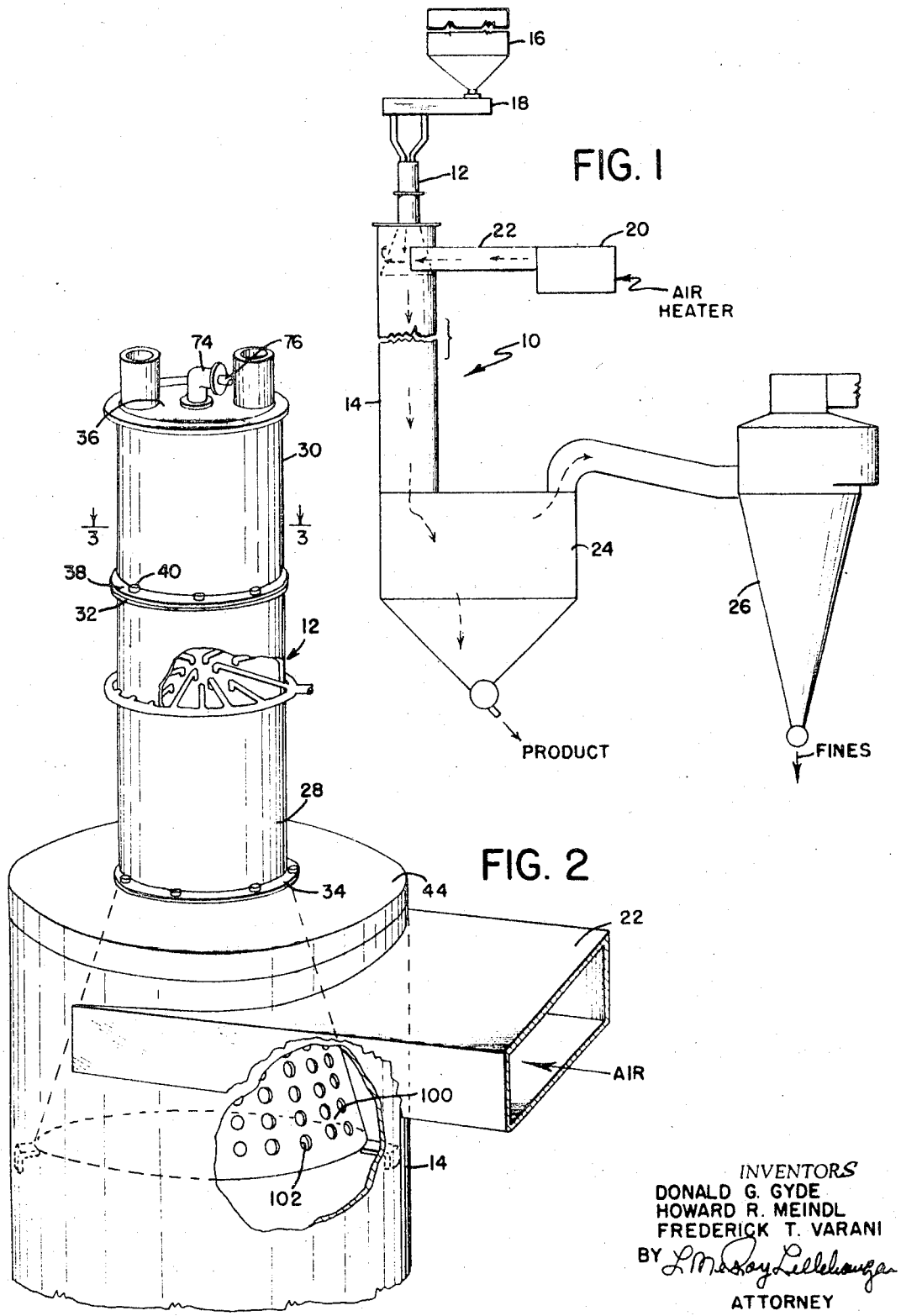

BY *L. M. Roy Lillehaugen*

ATTORNEY

United States Patent Office 3,463,098
Patented Aug. 26, 1969

3,463,098
LOW IMPACT AGGLOMERATOR AND METHOD
Donald G. Gyde, Minneapolis, and Howard R. Meindl, Brooklyn Center, Minn., and Frederick T. Varani, Warehouse Point, Conn., assignors to General Mills, Inc., a corporation of Delaware
Filed May 5, 1967, Ser. No. 636,349
Int. Cl. A21d 2/00
U.S. Cl. 107—54                    16 Claims

ABSTRACT OF THE DISCLOSURE

An apparatus and process for forming loosely-bound agglomerates from a powdery or pulverulent material, such as flour. Particles of the material are admitted into an agglomerating zone in such a manner that they are uniformly distributed over a prescribed cross-sectional area. An atomized spray of small water droplets is also introduced into the agglomerating zone, so that the spray covers the cross-sectional area of the particles of material being admitted into the agglomerating zone. The particles and the droplets are finely dispersed and intimately mixed to form agglomerates having a low bulk density or cup weight.

---

Numerous attempts have been made to change the form of powdery or pulverulent material such as cereal flour, so that it is easier to work with and handle. Powdery materials such as cereal flour, usually have a fine particle size, consequently they are quite dusty and difficult to handle. Other features of such materials are that they are quite difficult to wet and disperse in liquids without much mixing and/or agitation, and they are difficult to pour because they are not free flowing. While the present invention can be used with a variety of powdery materials, it will first be described herein in conjunction with the formation of agglomerates from cereal flour particles.

Various devices and methods have been devised for forming particles of flour into agglomerates of prescribed size ranges. This has been accomplished by combining the particles with a liquid such as water, in the form of steam or droplets; the particles and moisture are subjected to a high degree of impact so that they are mixed together, the particles contact each other, and form agglomerates which are randomly sized and shaped. Flour agglomerates formed according to this procedure have in general, been used with satisfactory results for many purposes. It has been found however, that the known prior art devices and methods have not been entirely satisfactory in producing agglomerates having the optimum characteristics as to desired bulk density, desired cup weight, dispersability and disintegration in liquid, and satisfactory usage in certain recipes and resulting products. In many instances, the agglomerates which are formed are too compact; as a result, they do not readily disintegrate when combined and dispersed in a liquid, and they do not have the desired low bulk density or cup weight. Furthermore, it has been found that some products, such as certain cookies and pastries, which are formed from recipes calling for little or no liquid ingredients, have been wholly unsatisfactory when formed by using agglomerates produced according to the known prior art. It has been found for example, that the doughs which are formed are not cohesive, and the baked goods are extremely crumbly. Another aspect of certain prior art devices is that they use steam for moistening the flour particles. It has been found that steam may have adverse effects on cereal flour which is to be used for certain purposes, because the starch may become at least partially gelatinized, the gluten may be adversely affected, and the like.

Accordingly, one object of the present invention is to provide an improved agglomerating apparatus.

Another object is to provide an apparatus for forming loose-structured agglomerates from a pulverulent or powdery material such as flour.

A further object is to provide an agglomerating apparatus which subjects the agglomerates to a minimum amount of compact.

Another object is to provide an agglomerating apparatus into which flour particles and water droplets are introduced, the particles and droplets being finely dispersed and intimately mixed to form agglomerates having a low bulk density or cup weight.

A still further object is to provide a new and improved process for forming agglomerates.

Still another object is to provide a process for forming an agglomerated flour having a low cup weight or low bulk density, by intimately mixing finely dispersed flour and water droplets together.

Another object is to produce a flour agglomerate which is dust-free, free flowing, readily dispersible and wettable in water, and having a relatively low cup weight.

Other objects and advantages of this invention will become apparent from a consideration of the following specification and drawings. Before proceeding with a detailed description of the invention however, a brief description of it will be presented.

Briefly, the agglomerating apparatus includes a vertically oriented agglomerating chamber into which a pulverulent or powdery material such as flour, is introduced. The flour particles are admitted into the top of the chamber in such a manner that optimum distribution of the particles is achieved; this is accomplished by distributing the particles substantially uniformly over the entire cross-sectional area of the chamber. At least one nozzle is provided for admitting a finely dispersed or atomized spray of water into the chamber in such a manner that optimum distribution of the water droplets is also achieved, and the entire cross-sectional area of the chamber is subjected to the spray. The pressurized water droplets collide with the flour particles and create a turbulent zone or environment within the chamber in which the flour particles and water droplets are intimately mixed. As a result, the flour particles are at least partially covered with water, and the particles contact each other and agglomerate to form loosely-bound clusters. Agglomerate quality improves as the water spray becomes finer, the wet agglomerate moisture decreases, and the distribution of flour and water improves.

The invention will best be understood by reference to the following drawings, wherein:

FIGURE 1 is a schematic view illustrating apparatus for forming agglomerates out of a pulverulent material;

FIG. 2 is an enlarged perspective view in partial section illustrating the agglomerating apparatus;

Figure 3:
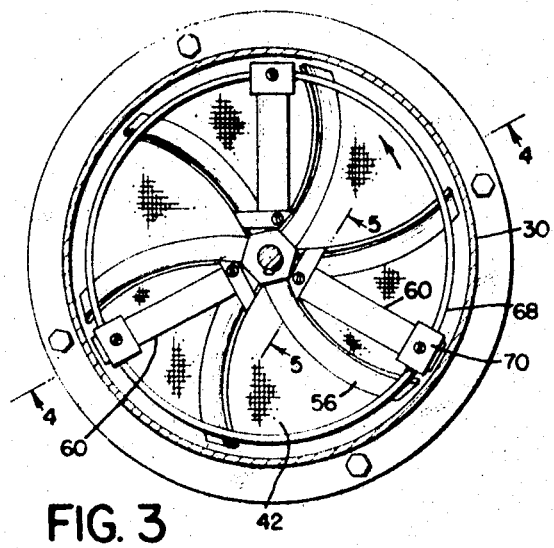
FIG. 3 is a view taken along line 3—3 of FIG. 2.

For purposes of illustration, the agglomerating apparatus will first be described in conjunction with the production of agglomerates out of a pulverulent material such as cereal flour. It should be realized of course, that the invention is readily usable for forming agglomerates out of other types of pulverulent or powdery material as well, such as dried milk powder, guar flour, cocoa powder, starch, and various mixes. As set forth below, the agglomeration of a powdery material such as milled guar is also described, thus illustrating another type of material which can be agglomerated with good results.

FIGURE 1 illustrates an agglomerating system having a minimum of moving parts designated generally by reference numeral 10, which includes a vertically oriented low impact agglomerator unit designated 12, and a drier unit designated 14. A pulverulent material such as flour is fed from a bin 16 to a feeder 18, from which it is admitted into the upper portion of the unit 12. The drier 14 is positioned below the agglomerator 12 for drying moistened agglomerates after they are discharged from the bottom of the agglomerator. A heater 20 is attached to the drier by an air duct 22, and it provides a source for heating the drying air introduced into the drier. The lower portion of the drier unit 14 is operatively connected to a settling or separation chamber 24, which separates the dried agglomerates from the drying air. A cyclone separator 26 removes particles entrained in the warm air, as the air passes through the separator.

FIGS. 2-6 illustrate the structure in somewhat greater detail. The low impact agglomerator 12 is constructed so that the flour particles are agglomerated with a minimum amount of compaction. The agglomerator 12 includes a cylindrically shaped agglomerating chamber 28, and a cylindrically shaped sifting mechanism 30 positioned above the chamber 28 for distributing the flour particles into the agglomerating chamber. The chamber 28 is provided with a flange 32 at its upper end, and a flange 34 at its lower end. The inner diameter of the chamber can vary, dependent upon the desired amount of agglomerated material which is to be produced. The sifter 30 is likewise cylindrically shaped and it has the same inner diameter as the inner diameter of the chamber 28. The upper portion of the sifter is provided with a cover 36, and its lower portion is provided with a flange 38. The chamber 28 and the sifter 30 are connected together by appropriate means, such as bolts 40 which connect the flanges 32 and 36 together. A screen 42, having a desired mesh size, e.g., 8 to 20, and preferably 12 for flour agglomeration, is interposed between the flanges 32 and 38, and maintained there between when the flanges are fastened together. The bottom portion of the chamber 28 is attached to the top 44 of the drier 14 by securing the flange 34 to the drier top so that material is discharged from the chamber 28 into the upper portion of the drier.

Figure 5:
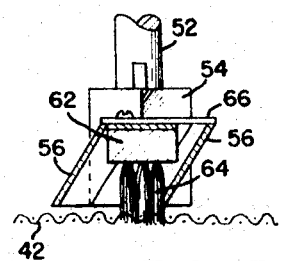
FIG. 5 is a partial view taken along line 5—5 of FIG. 4.
Figure 6:
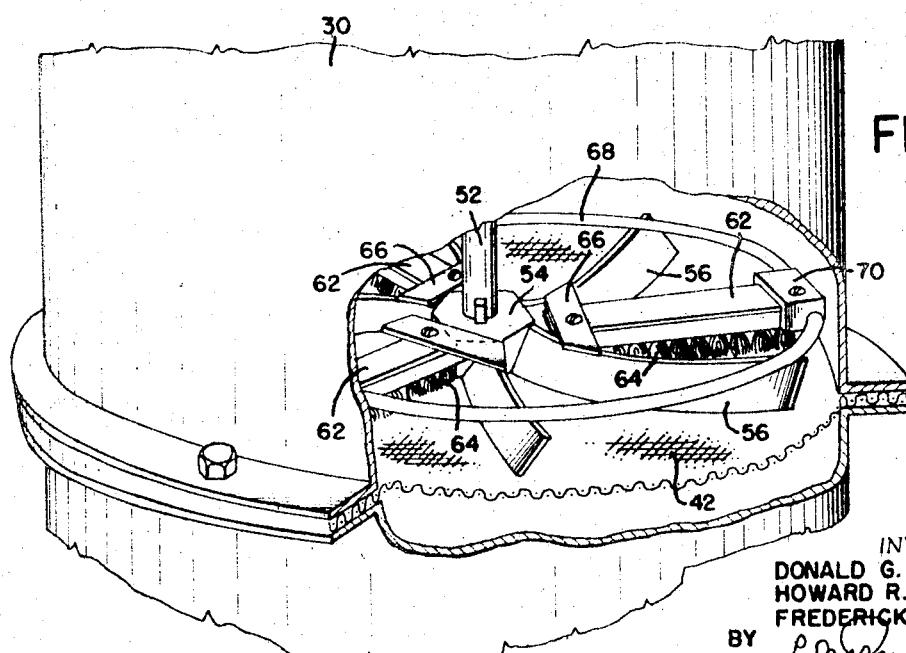
FIG. 6 is an enlarged partial perspective view illustrating the apparatus.

A rotor assembly 50 is provided within the sifter for agitating the flour therein, and dispersing and forcing the flour through the screen into the agglomerating chamber 28 at a prescribed feed rate. FIGS. 3-6 illustrate the sifter 30, and the rotor assembly 50 in greater detail. The assembly 50 includes a vertical shaft 52 having a hexagonal hub 54 fixedly secured to one end. A plurality of curved wiper blades or arms 56 are secured to the hub 54 in such a manner that they project radially away from the shaft axis. As illustrated in FIG. 6, one end of each blade is secured to the hub 54 by appropriate means, such as press fitting it within appropriate slots in the hub 54. A number of brush assemblies 60 are also fastened to the hub 54 and arms 56 so that they likewise project radially away from the shaft axis. Each brush assembly 60 includes a backing plate 62, and bristles 64 which are secured to the plate. As depicted in FIGS. 5 and 6, mounting brackets 66 are secured to the top edge of adjacent blades 56, e.g., by welding, and one end of the backing plate 62 is secured to the bracket 66. The opposite end of each brush assembly 60 is supported and maintained in spaced relationship by a hoop 68 which is secured to mounting brackets 70, to which the backing plates 62 are also attached. As shown in FIG. 5, the bottom edge of each blade 56 is spaced above the surface of the screen 42 by a predetermined amount; the bristles 64 of the brush assembly however, project through the screen by a small amount; thus the brushes prevent the screen from becoming plugged. It should be realized of course, that the number of wiping blades 56 and brush assemblies 60 can vary, as it may be preferred to provide more or less than that shown in the drawings.

The upper end of the shaft 52 is operatively connected to a second shaft 72 by means of a gear box 74 connected to the top 36 of the sifter 30. The shaft 72 in turn is operatively connected to a suitable drive means (not shown in the drawings) for causing the shafts to rotate about their respective axes.

It should be realized of course, that other types of devices could be used for forcing the flour particles through the screen. For example, one or more conduits could be provided for distributing the particles onto the screen surface, and means could be provided for causing the screen to vibrate at a prescribed amplitude, thus causing the particles so distributed, to flow through the openings in the screen.

Water is introduced into the agglomerating chamber by means of one or more nozzles positioned within the agglomerating chamber 28. It is important that the proper amount of water be added to the flour in the agglomerating chamber 28; if an improper amount of water is used, the optimum results will not be obtained. Moreover, it has been discovered that the manner in which the water is introduced into the chamber is important in obtaining optimum results. There is some variation in the amount of water added, depending on the agglomerating conditions, the type of flour, its particle size, and its protein content. Generally, the moist cereal flour agglomerates should have a moisture content of about 17 to 27%, and preferably about 22 to 23%. The amount of water added depends on the type of nozzle used, the size of the nozzle openings, as well as the pressure of the water when certain nozzles are used.

The type of nozzle used, as well as the number of nozzles used, can vary, dependent upon the size of the agglomerating unit, the rate of flow of material into the chamber, the available water pressure, the amount of water wanted for agglomerating purposes, and the like. While the type and number of nozzles can vary, it has been found that the success of the unit depends in part on the degree of atomization of the water, and the manner in which the water is distributed and dispersed within the chamber. Generally, it has been found that an agglomerate having the desired characteristics is produced when the water droplets are as small as possible. While it is difficult to define specifically the particular size of a water droplet, nozzles are commercially available which can produce an atomized spray of small droplets. Preferably, the size of the droplets should be smaller than the size of the flour particles, and for best results, the droplets should have a mean mass diameter of less than 40 microns.

Figure 4:
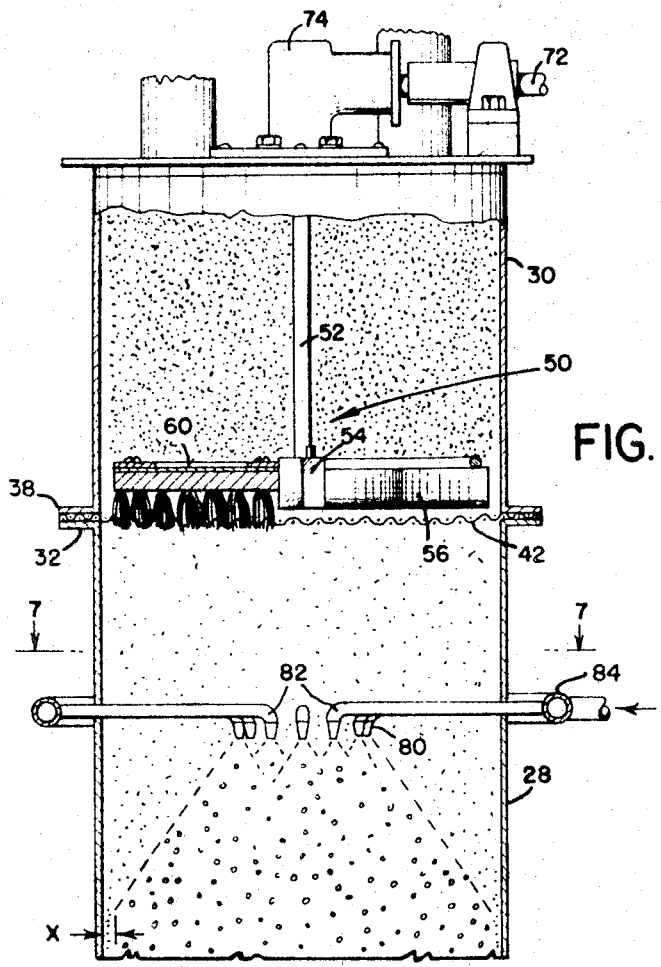
FIG. 4 is a partial side elevational view taken along line 4—4 of FIG. 3.
Figure 7:
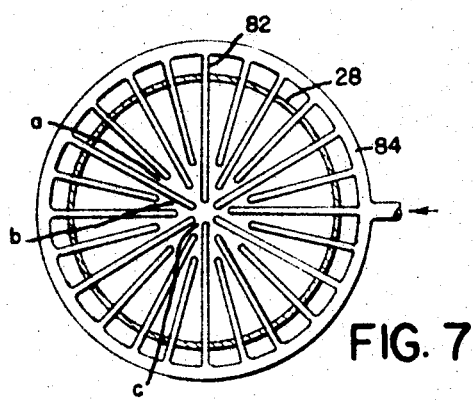
FIG. 7 is a sectional view taken along line 7—7 of FIG. 4.
Figure 9:
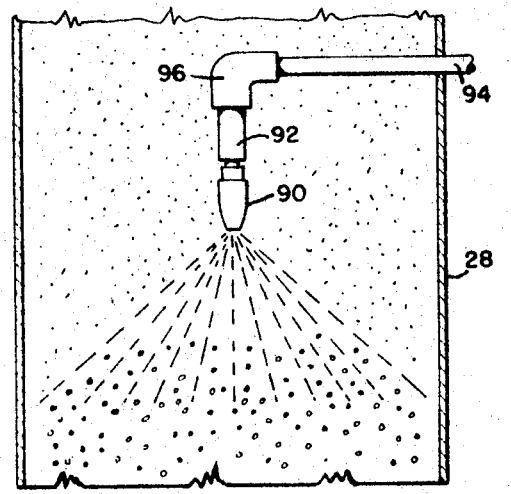
FIG. 9 illustrates another embodiment of the invention.

FIGS. 4 and 7 illustrated one arrangement for introducing water into the agglomerating chamber 28. As illustrated, a plurality of nozzles 80 are provided for introducing a plurality of downwardly-directed, cone-shaped atomized sprays into the chamber. As previously indicated, various nozzles are commercially available; therefore, their structure and operation will not be described in detail. For purposes of illustration, two types of nozzles which have been used are hydraulic atomizing nozzles, Nos. ¼ LN1 and ¼ LN2, manufactured by Spraying Systems Co., of Bellwood, Ill. These nozzles deliver a hollow cone spray pattern with uniform distribution; and fine atomization is obtainable with relatively low hydraulic pressures. These nozzles are shown for example in Catalog 25 entitled "Industrial Spray Nozzles and Accessories," Copyright 1963. Another type of nozzle which has been satisfactorily used is an astrospray nozzle, 1700 and 1800 series, manufactured by Astrosonics Incorporated, Syosset, N.Y.

When the hydraulic atomizing nozzles are used, a plurality of them are usually provided for best results. As depicted in FIG. 7 for example, each nozzle 80 is connected to a conduit 82 which projects through the chamber wall into the chamber along the same horizontal plane. Each conduit 82 is connected to manifold 84 which surrounds the chamber 28 and which is connected to an appropriate source and pump (not shown). The nozzles 80 are spaced with respect to each other so that the entire cross-sectional area of the chamber is subjected to the atomized spray. In this regard, the nozzles should not be too close to the chamber wall, otherwise some of the water droplets might collect on the wall surface, or some of the flour agglomerates might be directed toward the wall and collect on the wall as scalp, thus affecting the efficiency and overall operation of the system. It has been found that an arrangement similar to that depicted in FIG. 7 works with excellent results. As shown, one-third of the conduits end at a point so that the nozzles collectively form a first circle *a*; one-third of the conduits end at a point so that a second group of nozzles collectively form a second circle *b*; and the remaining one-third terminate at a point to form a circle *c*. The total spray pattern formed by the nozzles arranged in this manner, covers substantially the entire cross-sectional area of the chamber, and the spray moistens enough of the flour particles so that agglomerates are formed.

For best results, the outer edge of the moisture spray pattern should be such that the water droplets and flour particles which intersect proximate the inner surface of the chamber 28 are separated from the wall surface by an annular buffer zone *x* (note FIG. 4), in which no water droplets are present, although dry flour particles may be present. The purpose of the zone is to assure that no scalp or product becomes encrusted on the inner wall surface. The thickness of the buffer zone is not critical and it can vary within reasonable limits; the primary object being to avoid the formation of scalp on the wall surface. It has been found for example, that if the water droplets hit the wall surface and collect thereon, flour particles which subsequently contact the surface, may accumulate as undesirable scalp, i.e., accumulation of wet, oversized globules.

FIG. 8 illustrates another arrangement for positioning nozzles within the chamber 28. In this embodiment, all the nozzles are connected to the conduits 82 which are of equal length so that all the nozzles are equidistantly spaced from the wall of the chamber 28, and they collectively from a circle within the chamber. The opposite ends of the conduits are connected to a manifold 86, which is operatively connected to a source and pump, not shown. This type of arrangement also works with satisfactory results.

FIG. 9 illustrates another embodiment for introducing water into an agglomerating chamber 28. In this embodiment, a single nozzle 90 is provided for discharging an atomized spray into the chamber. The nozzle is attached to a vertical conduit 92, which in turn is attached to a horizontal conduit 94 by means of an elbow 96. The conduit 94 is connected to a pump and water source, and it positions the nozzle at the center of the cylindrical chamber. This arrangement works satisfactorily when the diameter of the chamber is not too large, the rate of flow of the material into the chamber is not too great, etc.

The drier 14 is a generally vertical, cylindrically shaped tube which is free of baffles and other interruptions so that a free, uninterrupted flow of air is obtained. The drier 14 includes a perforated air inlet cone 100 mounted within the upper portion of the drier. The openings or perforations 102 are uniformly spaced over the entire surface of the cone so that the air enters the cone uniformly from all sides to direct the particles away from the sides of the cone. The drier 14 is merely illustrative of one type of drier which might be used, and it should be realized that other types of drying systems could be used as well.

The operation of the apparatus will first be described for devices wherein multiple nozzles, e.g., hydraulic atomizing nozzles of the hollow cone spray pattern type are used. A pump (not shown), is provided for obtaining the desired pressure of the atomized spray. Flour, which is stored in the bin 16 and which has a predetermined moisture content, preferably at least 12%, is conveyed by the feeder 18 into the upper portion of the sifter 30. By rotating the shaft 52 about its axis at a prescribed rate, e.g., 15 r.p.m., the flour particles are forced through the screen 42 and admitted into the upper end of the agglomerating chamber 28 at a feed rate which depends upon the size of the apparatus, the speed of rotation of the shaft 52, and the like. The curved arms 56 and the brushes 60 cause the flour particles to pass through the screen and be distributed uniformly over the cross-sectional area of the chamber 28 in a substantially cylindrically-shaped column. In this regard, the drawings illustrate the sifter and chamber as having the same diameter. If preferred, the chamber could have a larger diameter, providing however, that the water spray substantially covers the area of the column of material being admitted into the chamber. In such a case, the buffer zone would be quite large. The curved arms 56 prevent the flour particles from bridging and building up adjacent the inner surface of the sifter wall, and the brushes assure that flour particles do not lodge in the screen. As the flour particles pass through the screen, they are sized to a prescribed granulation, and they drift downwardly toward the bottom of the agglomerating chamber 28 until they are subjected to the atomized spray from the nozzles 80, and intimately mixed with the spray droplets.

The atomized water droplets are discharged from the nozzles at a relatively high pressure, e.g., from 800 to 2000 p.s.i., and preferably above 1000 p.s.i. It has been found that for a given nozzle opening size, the size of the droplets gets finer up to a certain pressure, e.g., 800 p.s.i.; a pressure above this amount does not materially change the droplet size, but it does effect the amount of moisture introduced into the chamber. It has also been found that if the droplets are too large, the agglomerates might become too moist, and when dried, too compact; as a result, the product does not subsequently disperse or disintegrate as readily when combined with liquid. For optimum results, the agglomerates should disintegrate into particles which are substantially the same size as the original flour particles. The temperature of the water is not critical, as satisfactory results can be obtained when tap water having a temperature ranging from 50° to 70° F., is used. Higher or lower temperature could be used as well, although preferably, boiling water should not be used.

The nozzles 80 are preferably positioned within the chamber so that multiple downwardly-directed, cone-shaped atomized sprays are dispersed about the cross-sectional area of the chamber. As a result, the entire cross-sectional area of the chamber is subjected to the spray, and the water droplets collide and intimately mix with the flour particles, thus creating a turbulent environment within the chamber. As the flour particles collide with each other, they agglomerate into loosely bound clusters. The amount of moisture introduced into the chamber should be such that by the time the agglomerates pass through the agglomerating zone, they have a moisture content which ranges from about 18 to 26%, and preferably about 23%. Since there is a minimum amount of impact between the particles, they are loosely structured and are not formed into compact agglomerates.

The agglomerates pass directly from the chamber 28 into the upper portion of the drier 14, into which heated air having a temperature preferably ranging from about 100 to 500° F., and preferably about 300° F., is introduced. The optimum temperature depends upon the moisture content of the moist agglomerates, the moisture content of the incoming air, the flow rate of drying air, the size of the agglomerates, and the length of time the agglomerates are in the drier. The air should have a velocity of about 500 to 4,000 feet per minute, and preferably about 1,000 to 2,000 feet per minute. Generally, the air velocity should be as low as possible to avoid damaging the particles. Too high a velocity might tend to cause breakage of the agglomerate, while too low a velocity might not be conducive to good drying. The optimum velocity depends on the type of flour used, the diameter and length of the drier, and the like. By the time the air leaves the drier, its temperature is reduced to about 100 to 200° F., and preferably to about 150° F. When the agglomerates reach the separation chamber 24, their temperature is about 100 to 125° F., and their moisture content has been reduced to about 12 to 15%. The dried agglomerates settle to the bottom of the chamber 24, while the moist air passes to the cyclone separator 26 at which point the fines are removed from the air. From the chamber 24, the agglomerates are ultimately cooled if desired, and sized by sifting and grinding to obtain a product having a specified granulation and cup weight. After sifting, the agglomerates are either stored or packaged. The agglomerates thus formed have a relatively low bulk density, and a dipped cup weight which preferably ranges from about 105 to 123 grams.

When a single atomizing nozzle is used, such as an astrospray nozzle, 1800 series, both water and air are delivered to the nozzle, and an atomized spray is created which moistens the flour particles discharged from the sifter into the agglomerating chamber. The cross-sectional area covered by the spray should be large enough to cover the cross-sectional area of the column of material so that substantially all of the particles are subjected to moistening and/or mixing. In other respects, the operation of the apparatus is substantially the same as that described above.

The cereal flour agglomerates thus formed by using the above-described types of apparatus can be used for making a variety of food products. It has been found that the agglomerates can be used with excellent results for making such products as gravies, sauces, breads, and cakes; in addition, it has been used with excellent results for making products from recipes which call for little or no liquid ingredients, such as certain cookies and pie crusts. As pointed out hereinbefore, agglomerates formed according to the known prior art devices and methods, have not been wholly satisfactory when products formed from recipes which call for little or no moisture, are produced; in many instances, the doughs are not cohesive, and the baked goods are too crumbly. The agglomerates formed in accordance with the present invention overcome many of the disadvantages of the prior art.

The above described apparatus, as well as the above described processing conditions in general, can be used for forming guar agglomerates from guar flour as well. It has been found that a low impact agglomerator as above described, will produce guar agglomerates having advantages over prior art guar agglomerates because the new product retains an early viscosity development rate similar to the unagglomerated parent guar; i.e., it thickens rapidly when combined with water; and its dispersability and dry flow properties are excellent. While the processing conditions are generally the same as for cereal flour, sufficient water should be added during agglomeration to increase the moisture content of the guar from about 12.0% to a level ranging from 20–35%, and preferably about 30–31%. Example V described below sets forth specific processing conditions.

The invention will be better understood by reference to the following examples which are illustrations of certain embodiments of the invention and certain products which have been made by using agglomerates formed in accordance with the present invention.

Example I

Wheat flour particles having a protein content of about 10% and a moisture content of about 13.5% were admitted into a cylindrically shaped sifter having a diameter of 18 inches. A 12 mesh screen was interposed between the bottom of the sifter and the top of a cylindrically shaped agglomerating chamber, likewise having a diameter of 18 inches. The flour particles were sifted through the screen by rotating a rotor assembly positioned within the screen so that a feed rate of about 180 pounds per minute into the top of the chamber was obtained. The particles were admitted into the chamber in the form of a cylindrically shaped column which covered substantially the entire cross-sectional area of the chamber.

Atomized water droplets were introduced into the chamber by means of a cluster of hollow cone pressure nozzles (Spraying Systems Company No. ¼ LN1 Nozzles) mounted in a horizontal plane within the chamber so that three circular arrangements of nozzles similar to that shown in FIG. 7, were formed. The outer ring of nozzles were spaced at least 5 inches away from the inner surface of the chamber so that no scalp or product buildup would be formed on the wall surface. The water pressure to the nozzles was maintained at about 1400 p.s.i.g., and an atomized spray was formed by the nozzles which covered substantially the entire cross-sectional area of the chamber. The droplets formed by each nozzle were quite small, i.e., a mean mass diameter of about 30 microns. As the flour particles drifted downwardly, they were subjected to turbulent action caused by the spray; as a result, the flour particles were intimately mixed with the water droplets, and they were at least partly covered with water. The flour particles combined with each other to form agglomerates of loosely bound structures which passed out of the agglomerating chamber, having a moisture content of about 23.0%.

The agglomerates were discharged from the agglomerating chamber into the top of a cylindrically shaped drier having a diameter of 42 inches and a length of about 60 feet. Heated air having a temperature of about 300° F. and a velocity of about 2000 feet per minute was introduced into the upper part of the drier. As the agglomerates drifted toward the bottom of the drier, they settled in a chamber positioned at the bottom of the drier from which they were ultimately removed and cooled. After being cooled, the agglomerates were conveyed to a sifter which removed those agglomerates above a No. 50 milling wire and those smaller than a 14XX bolting cloth. The agglomerates were then packaged for future use. The resulting agglomerates had a moisture content of about 13.2%, they were loosely structured, they had a low bulk density, they disintegrated readily when combined with water, and for a standard cup of 236 cc., they had a cup weight when dipped of 117 grams. A sieve size analysis of the product (100 g. sample sieved 5 minutes on a Ro-Tap sifter) gave the following results:

TABLE I

| Through [1] | Over [1] | Percent product |
| --- | --- | --- |
| 0 | 45 wire (350μ) | 0 |
| 45 wire | 70 wire (210μ) | 2 |
| 70 wire | 100 wire (149μ) | 30 |
| 100 wire | 140 wire (105μ) | 20 |
| 140 wire | 200 wire (74μ) | 15 |
| 200 wire | | 15 |

[1] U.S. standard screen.

Russion teacake cookies were made by forming a dough by thoroughly mixing 1 cup of soft butter, ½ cup of sifted confectioner's sugar, 1 teaspoon vanilla and ¼ teaspoon salt together. To this mixture, 2¼ cups of the above flour agglomerates were combined and mixed; thereafter, ¾ cup of finely chopped nuts were added to, and mixed to form a dough. The resulting dough was formed into cohesive 1 inch balls which were then placed on an ungreased baking sheet and baked for 10 to 12 minutes at a temperature of about 400° F. The baked cookies were then rolled in powdered sugar and allowed to cool. The cooky dough was soft, smooth, and cohesive, and the resulting cookies were relatively solid, in that they did not crumble easily when squeezed between the fingers.

Example II

Two 8 inch diameter pie crusts were formed by combining and mixing 1¾ cups of the above agglomerate with 1 teaspoon salt; ¾ cup of shortening was combined with the flour and mixed at low speed with a family type Kitchen Aid mixer for 1 minute, making sure that the sides of the bowl were scraped constantly. ¼ cup of water was then added and the dough was mixed for about 1 minute or until all the flour was moistened and the dough began to gather into the beaters. The dough was then gathered together by hand and pressed firmly into a ball which was then divided and flattened to make two pie crusts. The dough was soft and cohesive, and when baked it produced excellent crusts.

Example III

Figure 8:
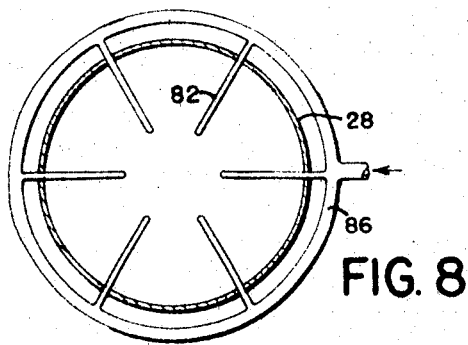
FIG. 8 illustrates another embodiment of the invention.

Wheat flour agglomerates were formed by using an apparatus similar to that described in conjunction with Example I, with several minor structural and processing changes. The diameter of the sifter and the chamber was reduced to 12 inches, the diameter of the drier was 42 inches, and 6 hollow cone pressure nozzles, Spraying Systems Company No. ¼ LN1 Nozzles, were arranged within the chamber so as to form a single circle, similar to that shown in FIG. 8. The nozzles were spaced about 5 inches away from the wall of the chamber. Flour having a moisture content of about 13% was admitted into the agglomerating chamber in the form of a cylindrically shaped column, at a feed rate of about 40 pounds per minute. Atomized water was introduced through the 6 nozzles, at a pressure of about 2200 p.s.i.g. The flour particles and the water droplets were intimately mixed together, and agglomerates having a moisture content of about 23.5% were admitted into the drier where they were dried to a moisture content of about 14%. The dipped cup weight of the agglomerates was about 119 for a standard cup of 236 cc. A sieve size analysis of the product gave the following results:

TABLE II

| Through¹ | Over¹ | Percent product |
| --- | --- | --- |
| 0 | 45 wire | 0 |
| 45 wire | 70 wire | 7 |
| 70 wire | 100 wire | 39 |
| 100 wire | 140 wire | 32 |
| 140 wire | 200 wire | 16 |
| 200 wire |  | 6 |

¹ U.S. standard screen.

The agglomerates thus formed were used for making the same type of products formed in Examples I and II, with excellent results.

Example IV

Agglomerated flour was prepared by admitting wheat flour particles having a moisture content of about 14.0% into an agglomerator unit formed of a 12 inch diameter sifter and a 12 inch diameter agglomerating chamber positioned below the sifter. The sifter included a 12 mesh screen and a rotor assembly which forced the flour particles through the screen. The flour particles were discharged from the sifter and distributed uniformly over the cross-sectional area of the chamber at a feed rate of about 50 pounds per minute. An atomized spray of water was introduced into the chamber by means of a single astro-spray nozzle, Model No. 1811. The nozzle discharged a cone-shaped, downwardly-directed spray of fine sized water droplets into the chamber so that substantially the entire cross-sectional area of the chamber was subjected to this spray. As the flour particles passed through the spray zone, they were subjected to turbulent action and they were intimately mixed with the fine sized water droplets, thus forming agglomerates which were ultimately discharged from the chamber into a drier unit. The moisture content of these agglomerates was about 23%. Heated air admitted into the drier reduced the moisture content of the agglomerates to about 14.0%. The agglomerates which were ultimately discharged from the drier were loosely bound, they had a low bulk density, they had a cup weight of 119 grams, and they dispersed readily when combined with a fluid medium, for example when making gravy. A sieve size analysis of the product gave the following results:

TABLE III

| Through¹ | Over¹ | Percent product |
| --- | --- | --- |
| 0 | 45 wire | 2 |
| 45 wire | 70 wire | 9 |
| 70 wire | 100 wire | 27 |
| 100 wire | 140 wire | 40 |
| 140 wire | 200 wire | 17 |
| 200 wire |  | 5 |

¹ U.S. standard screen.

Example V

Guar flour, prepared by a conventional milling process, having a size smaller than 60 mesh, was admitted into a 12 inch diameter cylindrical sifter positioned above a 12 inch diameter agglomerating chamber. The flour particles were admitted into the chamber at a feed rate of about 10 pounds per minute in the form of a cylindrical column, by passing them through a flat 16 mesh screen interposed between the sifter and the chamber, by rotating a rotor assembly mounted within the sifter at about 12 r.p.m. An atomized spray of fine water droplets was introduced into the chamber by means of a single astro-spray nozzle, Model No. 1713, which discharged a downwardly-directed, cone-shaped spray into the chamber so that substantially the entire cross-sectional area of the column of guar flour was subjected to the spray. As the flour passed through the spray zone, the moisture content of the particles was increased from about 12% to about 31%, and they became agglomerated into loosely bound clusters.

The agglomerates were discharged from the chamber into the top of a drier unit into which heated air having a temperature of about 375° F., and a velocity of about 2000 feet per minute, was introduced. The drier unit was cylindrically shaped, it had a diameter of 18 inches, and a length of about 25 feet. The agglomerates when dried to a moisture level of about 12%, were thereafter cooled, and sized in a sifter which removed those agglomerates larger than a No. 50 milling wire, and those smaller than a 16XX bolting cloth. The guar agglomerates were loosely bound, they had a low bulk density and a dipped cup weight of 84 grams for a standard cup of 236 cc., when combined with water they dispersed readily, they had a viscosity development rate which was excellent and approached that of the original guar flour, and they had good flow characteristics. A sieve size analysis of the product gave the following results:

TABLE IV

| Through¹ | Over¹ | Percent product |
| --- | --- | --- |
| 0 | 45 wire | 0 |
| 45 wire | 70 wire | 26 |
| 70 wire | 100 wire | 31 |
| 100 wire | 140 wire | 22 |
| 140 wire | 200 wire | 19 |
| 200 wire |  | 2 |

¹ U.S. standard screen.

The apparatus and processes described herein have been used to produce an excellent agglomerated flour, an agglomerate which is loosely structured, which disintegrates and disperses readily in water, which has a low bulk density or cup weight, and which can be used in cooking and baking recipes to make products which have in the past been difficult to make satisfactorily with an agglomerated cereal flour formed by known prior art agglomerating procedures. It has been discovered that the production variables having the greatest effect on agglomerated flour quality are the degree of atomization of the water, the level of agglomerating water added, and the distribution of the flour and water within the agglomerating chamber. The present invention provides an apparatus and process for obtaining these objectives; as a result, the agglomerated flour which is formed produces excellent results when used for baking or cooking purposes.

In the above description and attached drawings, a disclosure of the principles of this invention is presented, together with some of the embodiments and examples by which the invention may be carried out.

Now therefore, we claim:

1. An apparatus for forming agglomerates comprising a vertically oriented agglomerating chamber, means for admitting a column of pulverulent material to be agglomerated into the upper portion of said chamber by distributing the particles of material substantially uniformly over the cross-sectional area of said column within the chamber, and at least one vertically oriented nozzle within said chamber for introducing and vertically discharging a fluid medium into said agglomerating chamber in the form of a downwardly directed cone-shaped atomized spray, said nozzle being positioned with respect to the edges of the column of material so that substantially the entire cross-sectional area of the column of material being admitted into the chamber is covered by said spray, the droplet of said fluid medium intersecting and intimately mixing with the downwardly flowing particles of pulverulent material, said droplets flowing through the chamber in such a manner that they do not contact the inner wall surface of the chamber.

2. The combination of claim 1 wherein the pulverulent material is introduced into said chamber in a substantially cylindrically-shaped column.

3. The combination of claim 2 wherein the means for introducing the pulverulent material into the chamber includes sifting means positioned above said chamber for discharging and distributing particles having a prescribed size range into said chamber.

4. The combination of claim 3 wherein said sifting means includes a screen member of a prescribed mesh and a rotor assembly for dispersing and forcing the pulverulent material through said screen member, said screen forming the bottom portion of the sifter and having a substantially flat surface, and said rotor assembly including at least one wiper blade and one brush assembly for forcing said material through the screen member.

5. The combination of claim 1 wherein the mean mass diameter of the fluid medium droplets is less than 40 microns, said size being smaller than the size of the particles of material.

6. The combination of claim 1 wherein a plurality of vertically oriented nozzles are provided within the chamber for introducing the fluid medium into the chamber, said nozzles being positioned proximate the center of the column of material and with respect to each other so that they all lie on substantially the same horizontal plane.

7. The combination of claim 1 wherein a drier is provided for reducing the moisture content of the agglomerated particles after they have passed downwardly through the agglomerating chamber, and means are provided for positioning said drier below said chamber.

8. An apparatus for forming agglomerates comprising a vertically oriented agglomerating chamber, means for admitting pulverulent material to be agglomerated into the upper portion of said chamber by distributing said material substantially uniformly over a prescribed cross-sectional area within the chamber, said means including sifting means positioned above said chamber for discharging and distributing particles having a prescribed size range into said chamber, said sifting means including a screen member of a prescribed mesh, said screen forming the bottom portion of the sifter and having a substantially flat surface, means for forcing the pulverulent material through the screen including at least one arm which is rotatable about a vertical axis, means for preventing the screen from becoming plugged as the pulverulent material passes therethrough, and at least one nozzle for introducing a fluid medium into said agglomerating chamber, said nozzle discharging said fluid medium in the form of a downwardly directed cone-shaped atomized spray so that substantially the entire cross-sectional area of the material being admitted into the chamber is covered by said spray, the droplets of said fluid medium intersecting and intimately mixing with the downwardly flowing particles of pulverulent material.

9. A process for forming free flowing agglomerates from a pulverulent material which comprises forming a column of downwardly flowing particles of said material, said column having a prescribed cross-sectional shape, and said particles being distributed substantially uniformly over the cross-sectional area of said column, passing said column into a confining zone, moistening said particles, and subjecting them to turbulent action by introducing a spray of atomized droplets into said confining zone without moistening the walls of said confining zone, the cross-sectional area covered by said spray being substantially the same as the cross-sectional shape and area of the column of material.

10. A process for forming free flowing agglomerates from pulverulent material which comprises passing particles of said material through a screen having a prescribed size mesh, forming said particles into a downwardly flowing column having a prescribed cross-sectional shape, distributing said particles substantially uniformly over the cross-sectional area of said column, admitting said particles into the upper portion of a vertically oriented chamber having a cross-sectional size and shape which is substantially the same as that of the downwardly flowing column, introducing a fluid medium into said chamber, forming said fluid medium into droplets of predetermined size, forming said droplets into at least one cone-shaped, downwardly-directed spray by forcing said medium through at least one vertically oriented nozzle, said nozzle being positioned within the chamber so that the cross-sectional area of said column is subjected to said spray, directing said spray droplets downwardly within the chamber without causing them to contact the inner wall surface of the chamber, mixing and blending the particles and the droplets together so that the particles are caused to agglomerate as they pass downwardly through the chamber, and discharging the agglomerates from the lower portion of said chamber.

11. The process of claim 10 which includes drying the agglomerates by subjecting them to a heated gaseous medium after they have been discharged from the chamber.

12. A process for forming free flowing agglomerates from pulverulent material which comprises passing particles of said material through a screen having a prescribed size mesh, forming said particles into a downwardly flowing column having a prescribed cross-sectional shape, admitting said particles into the upper portion of a vertically oriented chamber having a cross-sectional size and shape which is substantially the same as that of the downwardly flowing column, introducing a fluid medium into said chamber, forming said fluid medium into droplets of predetermined size, forming said droplets into at least one cone-shaped, downwardly-directed spray by forcing said medium through at least one downwardly directed nozzle, said nozzle being positioned within the chamber so that the cross-sectional area of said column is subjected to said spray, mixing and blending the particles and the droplets together so that the particles are caused to agglomerate as they pass downwardly through the chamber, the moisture content of the particles being increased from about 12% to about 35% during agglomeration, discharging the agglomerates from the lower portion of said chamber, and drying the agglomerates by subjecting them to a heated gaseous medium after they have been discharged from the chamber.

13. The process of claim 12 wherein the moistened agglomerates are dried to a moisture content which ranges from about 10–15%.

14. The process of claim 12 wherein the agglomerates are formed from cereal flour particles, the moisture content of said particles being increased to about 18–26% during agglomeration, and being reduced to about 12–14% during drying.

15. The process of claim 12 wherein the agglomerates are formed from guar flour, the moisture content of said moistened guar ranging from 25–35%, and the moisture content of the dried agglomerates ranging from about 11–13%.

16. The process of claim 10 wherein the mean mass diameter of the atomized droplets is less than 40 microns.

References Cited

UNITED STATES PATENTS

| 1,700,510 | 1/1929 | Oches | 107—30 |
| 1,790,347 | 1/1931 | Hawkins. | |
| 2,850,388 | 9/1958 | Peebles et al. | 99—199 |
| 3,143,428 | 8/1964 | Reimers et al. | |
| 3,207,824 | 9/1965 | Wurster et al. | 264—117 |
| 3,313,629 | 4/1967 | Thompson et al | 264—117 X |

EDWARD L. ROBERTS, Primary Examiner

U.S. Cl. X.R.

99—199, 246; 107—4, 30; 264—117